United States Patent [19] [11] 3,713,068
Talmo [45] Jan. 23, 1973

[54] BONDED ASSEMBLIES AND METHODS OF MAKING THE SAME

[75] Inventor: Robert Eugene Talmo, Pasadena, Calif.

[73] Assignee: International Telephone and Telegraph Corporation, New York, N.Y.

[22] Filed: June 7, 1971

[21] Appl. No.: 150,502

Related U.S. Application Data

[63] Continuation-in-part of Ser. No. 871,894, Oct. 28, 1969.

[52] U.S. Cl. ............................ 338/2, 156/272, 65/59
[51] Int. Cl. ............................................... G01l 1/22
[58] Field of Search ............ 338/2, 3, 4, 5; 156/272; 65/59, 40

[56] References Cited

UNITED STATES PATENTS

| 3,327,270 | 6/1967 | Garrison | 338/2 |
| 3,417,459 | 12/1968 | Pomerantz | 156/272 |
| 3,084,300 | 4/1963 | Sanchez | 338/2 |
| 3,314,035 | 4/1967 | Sanchez | 338/5 |

Primary Examiner—William M. Shoop, Jr.
Assistant Examiner—Harvey Fendelman
Attorney—C. Cornell Remsen, Jr., Walter J. Baum, Paul W. Hemminger and Charles L. Johnson, Jr.

[57] ABSTRACT

A transducer assembly including a laminate of a silicon strain gauge and a nickel steel cantilever beam bonded together with a sheet of glass of a critical thickness. The method of the invention includes the step of applying a DC voltage across the joints to be bonded during a heating step. Improved bonds are obtained by the use of field distributing auxiliary glass. The use of a P-N junction type silicon strain gauge also improves the bond and avoids warpage.

3 Claims, 8 Drawing Figures

PATENTED JAN 23 1973 3,713,068
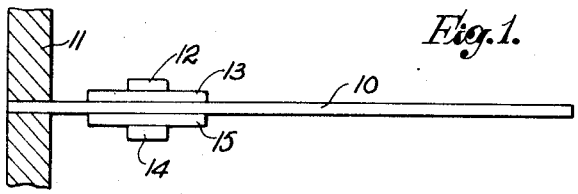
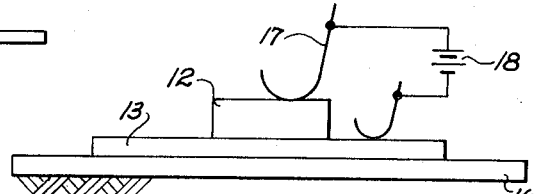
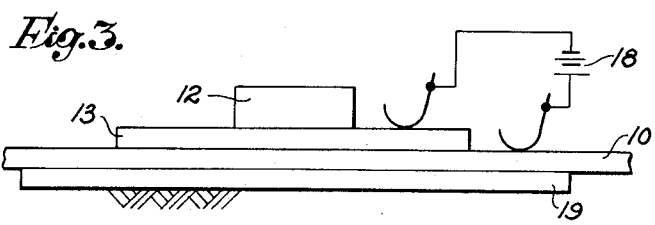
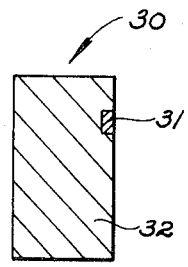
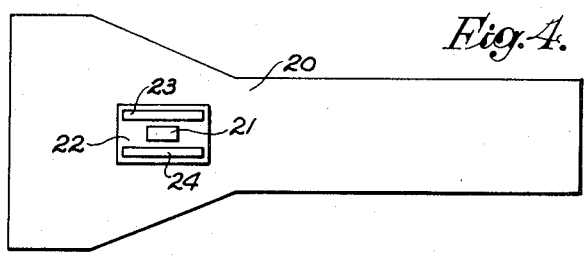
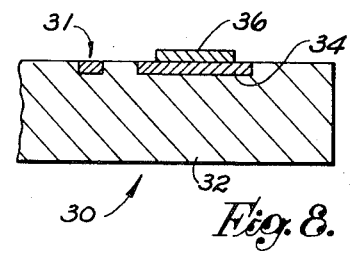
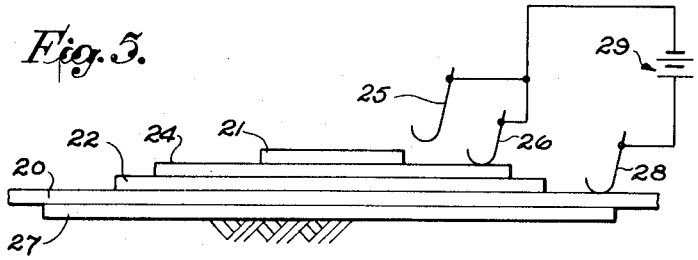
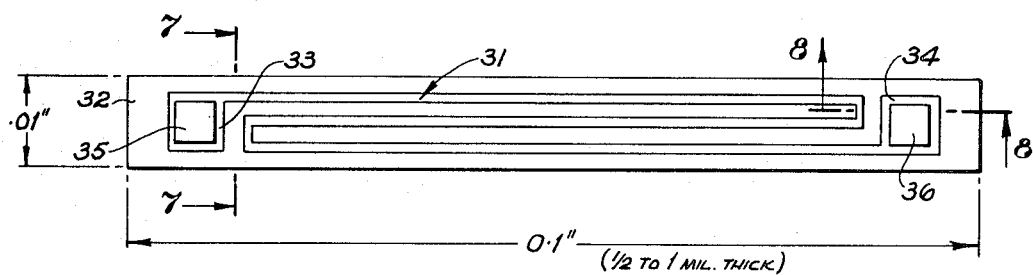
INVENTOR.
ROBERT E. TALMO
BY
ATTORNEY

BONDED ASSEMBLIES AND METHODS OF MAKING THE SAME

BACKGROUND OF THE INVENTION

This application is a continuation, in part, of copending application Ser. No. 871,894 filed Oct. 28, 1969. The benefit of the filing date of said copending application is, therefore, hereby claimed for this application. Attention is also hereby called to the prior art in said copending application made of record both by applicant and the examiner in charge thereof.

This invention relates to the bonding art and, more particularly, to a glass-to-metal bond, and methods for producing the same.

In the past, strain gauges have been bonded to opposite sides of a cantilever beam and connected in a bridge circuit. The output of the bridge is then proportional to the movement of the free end of the beam. The assembly thus acts as a transducer which converts beam movement into an electrical signal.

Previously, an epoxy has been employed to bond the strain gauges to the beam. However, at high temperatures, the epoxy "creeps." That is, it nonelastically elongates or compresses with beam deflection. This means that the strain gauges are not held tight to the beam surfaces and do not move therewith. The strain gauges, thus, give erroneous readings.

SUMMARY OF THE INVENTION

In accordance with the device and method of the present invention, the above-described and other disadvantages of the prior art overcome by providing a sheet of glass between a semiconductor or a metal strain gauge and a metal cantilever beam to which the latter two are bonded.

It is unexpected that such an arrangement would work, although it does so. In the first place, glass also creeps at high temperatures. However, it has been discovered that the amount of creep declines substantially with glass sheet thickness. Thus, it is possible to obtain excellent characteristics with a glass sheet of a critical thickness—less than 0.002 inch. Further, the differences between the coefficients of expansion of the glass and metals are so great that the glass normally cracks on cooling after bonding. However, in accordance with the present invention, it has been found that the glass does not crack when it has a critical thickness of less than 0.002 inch thick.

One feature of the invention resides in the use of an electric bonding process for an improved bond.

Another feature of the present invention resides in the use of auxiliary glass to distribute the electric field in the bonding process.

A further feature of the invention resides in the use of a semiconductor strain gauge having a P-N junction. A better bond is thereby achieved and warping is eliminated due to physical configurations of diffused gages.

The above-described and other advantages of the invention will be better understood from the following description when considered in connection with the accompanying drawings.

BRIEF DESCRIPTION OF THE DRAWINGS

In the drawings, which are to be regarded as merely illustrative:

FIG. 1 is a side elevational view of a transducer assembly;

FIG. 2 is a side elevational view of a subassembly under construction;

FIG. 3 is a side elevational view of another subassembly under construction;

FIG. 4 is a top plan view of a portion of a transducer illustrating another feature of the present invention;

FIG. 5 is a side elevational view of the transducer portion shown in FIG. 4;

FIG. 6 is a top plan view of a strain gauge;

FIG. 7 is a sectional view of the strain gauge taken on the line 7—7 shown in FIG. 6; and FIG. 8 is another sectional view of the strain gauge taken on the line 8—8 shown in FIG. 6.

DESCRIPTION OF THE PREFERRED EMBODIMENT

In FIG. 1, a cantilever beam 10 is shown having its left end fixed in a support 11. A strain gauge 12 is bonded to beam 10 by a glass layer 13. A strain gauge 14 is bonded to the opposite side of beam 10 by a glass layer 15. Strain gauges 12 and 14 may be identical. Glass layers 13 and 15 may also be identical.

Although none of the materials, temperatures, and voltages set forth herein are critical, glass layers 13 and 15 must be of a critical thickness—less than 0.002 inch and preferably 0.001 inch thick or less.

Preferably, beam 10 is made of a nickel-steel alloy about 35 to 45 percent nickel, by weight. Preferably strain gauges 12 and 14 are made of monocrystalline silicon. Layers 13 and 15 are preferably made of Corning 7740 Pyrex glass.

In FIG. 2, strain gauge 12 is shown with glass layer 13 on support 16. A light spring 17 holds the three layers together. A battery 18 is connected from strain gauge 12 to glass 13. Strain gauge 12 is thus maintained positive with respect to glass 13. Battery 18 preferably supplies a difference of potential from 150 to 1,000 volts. The difference of potential is applied while the temperature of strain gauge 12 and of glass 13 is preferably maintained between 600° and 800° Fahrenheit.

The difference of potential is applied at least by the time that the parts have reached the temperature range of 600° to 800° Fahrenheit. When the difference of potential is applied, the current from battery 18 will immediately rise to a peak value of about 5 microamperes. It will then decline exponentially with time to about 0.5 microamperes. It will generally take about 5 minutes for this decline. When the current has fallen after the peak to about 60 percent of the peak value, the bond between strain gauge 12 and glass 13 will have been made so that these components parts may be cooled and battery 18 removed for further assembly.

As shown in FIG. 3, strain gauge 12, now bonded to glass 13, is lightly pressed against beam 10 by spring 17. A support 19 is positioned under beam 10. Battery 18 maintains beam 10 positive with respect to glass 13. From here on, the steps performed are exactly the same as those in bonding strain gauge 12 to glass 13. That is, the temperature of the component parts 10, 12 and 13 are raised between 600° and 800° Fahrenheit. When the current supplied by battery 18 has peaked and reduced to sixty percent, the process is over and the parts may be allowed to cool and battery 18 removed. Thus far, it has been explained how strain gauge 12 may be bonded to beam 10. Strain gauge 14 may be bonded to beam 10 in exactly the same way. The current peak in bonding to beam 10 will generally be 20 microamperes.

The process of obtaining a single bond will usually take from about 2 to 20 minutes.

Two bonds may be produced simultaneous, if desired.

As stated previously, glass of a thickness equal to or more than 0.002 inch will creep at high temperatures. In such a case, strain gauges 12 and 14 would give erroneous readings. However, by employing glass sheets 13 and 15 of a thickness of less than 0.002 inch or preferably less than 0.001 inch, the problem of creep is overcome. In addition to the foregoing, during the bonding process of heating, it has been found that glass sheets for layers 13 and 15 of a thickness equal to or greater than 0.002 inch will crack during cooling. This problem has been overcome in accordance with the present invention by using glass sheets of a thickness less than 0.002 inch and preferably less than 0.001 inch.

Note will be taken that the order of steps of the present invention is not critical. However, if a strain gauge is bonded to a glass layer before the glass layer is bonded to beam 10, a visual inspection of the bond can determine whether or not the bond is satisfactory. When the glass layer is bonded to the beam 10, a partial visual inspection can be made around the edges of the strain gauge.

Note will be taken that the current supplied by battery 18 is not critical. Typical values only have been given.

Some of the prior art where bonding of metals to glass is disclosed in U.S. Pat. Nos. 3,397,278 and 3,417,459. The prior art taught in these patents may be used in the practice of the present invention as applicable. For example, surface finish and flatness are important. The description thereof in the said patents may, therefore, be used to practice the present invention. Further, the glass should at least be thick enough to withstand voltage breakdown or arcing when the voltage of battery 18 is supplied.

In FIG. 4, a cantilever beam is shown at 20. A strain gauge 21 has already been bonded to a sheet of glass 22. Glass sheet 22 is now about to be heated and bonded to beam 20 by passing current therethrough as before. However, in FIG. 4, two auxiliary pieces of glass 23 and 24 are located on top of sheet 22. Electrodes 25 and 26 shown in FIG. 5 are then brought into contact with the upper surfaces of pieces 23 and 24, respectively, all the parts above beam 20 and the beam 20 itself being supported by a member 27. An electrode 28 contacts beam 20. Electrodes 25 and 26 are connected to the negative terminal of a source 29, electrode 28 being connected to the positive terminal thereof.

It has been found that a substantially better bond between glass sheet 22 and beam 20 may be made by the use of the auxiliary glass pieces 23 and 24. A more uniform and desirable electric field distribution is the suspected reason for the improvement. Physical holding in close, flat areas of proximity is also a reason.

A better bond may also be produced with a strain gauge 30 shown in FIGS. 6, 7 and 8. The strain gauge 30 is a semiconductor strain gauge having a P conductivity type strip 31 embedded in an N conductivity type substrate 32. Strip 31 may have an upper surface lying in a single first plane in which the upper surface of substrate 32 lies. The lower surface of strip 31 lies in a single second plane parallel to the said first plane. Strip 31 has end portions 33 and 34 to which gold contacts 35 and 36, respectively, are bonded. Strain gauge 30 may be made of any conventional process.

In bonding strain gauge 30 to a sheet of glass, bottom substrate surface 37 shown in FIG. 8, is placed in engagement with the sheet. The positive DC source terminal is then connected to one of the gold contacts 35 and 36. The negative DC source terminal is then connected to the glass sheet, as before.

Again, in this case, an improved bond is achieved. Good gold contacts 35 and 36 and a good uniform electric field distribution due to the P-N junction are the suspected reasons for the improvement in performance.

When the resistance of strip 31 changes with the stress thereon, an electrical output directly proportional to the stress may be produced by making connections to both of the gold contacts 35 and 36.

What is claimed is:

1. The method of bonding a metal member to a main glass member comprising the steps of: placing an auxiliary glass member in contact with the main glass member; placing the metal member in contact with the main glass member; heating all of the members; and connecting a source of potential between the auxiliary glass member and the metal member while the main glass member is in contact with both and while the members are heated as aforesaid.

2. The invention as defined in claim 1, wherein the main glass member is a horizontal sheet of glass supported underneath by the metal member, said auxiliary glass member being located on top of the main glass member, said source being connected to the top surface of said auxiliary glass member.

3. The invention as defined in claim 2, wherein said source indicates a DC source of potential.

* * * * *